United States Patent [19]

Scott

[11] Patent Number: 4,505,228
[45] Date of Patent: Mar. 19, 1985

[54] DOG FEEDER

[76] Inventor: John H. Scott, 5054 Maple Ave., St. Louis, Mo. 63113

[21] Appl. No.: 522,110

[22] Filed: Aug. 11, 1983

[51] Int. Cl.$^3$ .......................... A01K 5/01; A01K 7/00
[52] U.S. Cl. .................................................. 119/62
[58] Field of Search ........................... 119/61, 62, 73

[56] References Cited

U.S. PATENT DOCUMENTS

| | | | |
|---|---|---|---|
| 2,191,811 | 2/1940 | Trampier, Sr. | 119/61 X |
| 2,629,040 | 2/1953 | Smith | 119/73 |
| 2,677,350 | 5/1954 | Prestidge et al. | 119/61 |
| 2,936,926 | 5/1960 | Miller | 119/61 |
| 3,734,062 | 5/1973 | O'Hara | 119/61 |
| 4,007,711 | 2/1977 | Michael | 119/62 X |
| 4,343,264 | 8/1982 | Schafer et al. | 119/73 |

FOREIGN PATENT DOCUMENTS 1187812  9/1959  France ................................ 119/61

*Primary Examiner*—Robert P. Swiatek
*Attorney, Agent, or Firm*—Kalish & Gilster

[57] ABSTRACT

A dog feeder for protecting and preserving food or fresh water to be made available upon self-initiated action of the dog includes a food or water vessel, an insect-isolating tray, and a closure for the vessel. The tray surrounds the vessel in the form of a moat. The vessel is thereby isolated from insects by water or other liquid contained within the tray. The closure is hinged to the vessel for being liftable by the dog's nose for permitting its access to the vessel's contents. A stop arrangement interengaging the closure and vessel limits lifting of the closure to a predetermined extent, thereby assuring of continued protection of the contents of the vessel even when the dog has obtained access to the vessel interior and assuring of subsequent closing of the closure under force of gravity.

1 Claim, 5 Drawing Figures

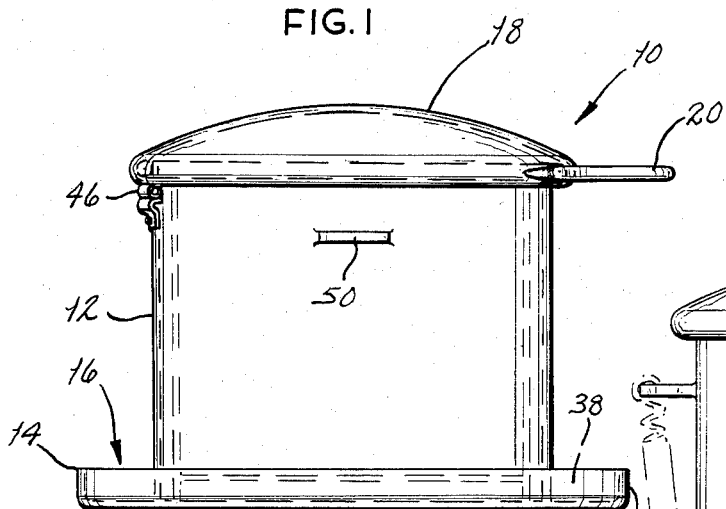
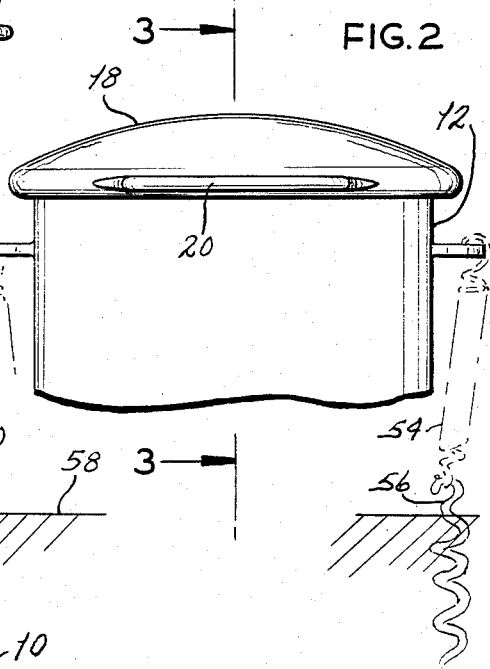
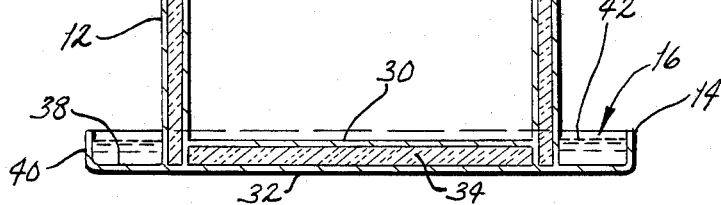
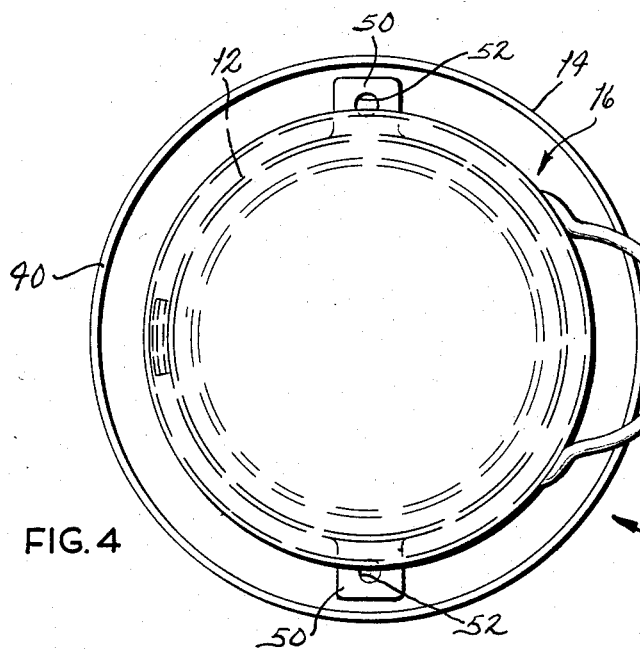
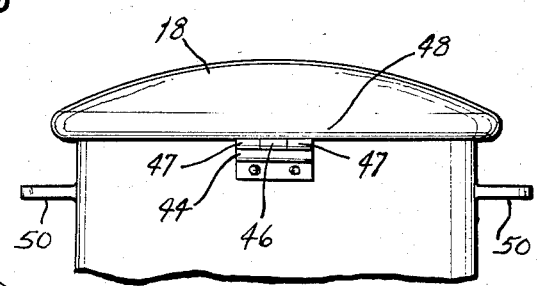

DOG FEEDER

BACKGROUND AND SUMMARY OF THE INVENTION

This invention relates to animal feeders, and, more particularly, to an improved feeder for dogs for protecting and preserving food or fresh water to be made available upon self-initiated action of a dog.

There are a number of feeders in the prior art involving containers having a lid or closing member which can be lifted or tipped out of the way by the action of an animal. Such arrangements are disclosed, for example, in the following U.S. Pat. Nos. Quigley 2,055,544; Hatcher 2,709,988; Struck 2,972,979; Chilovich 3,077,863; Elkins 3,575,141; and Mann 4,303,040.

Such prior art feeders have certain disadvantages, among which are that they do not adequately protect the contents of the feeder against moisture, against spoilage, such as through heat, and against insects. Further, some of the feeders of the prior art are too expensive in construction to be amenable for mass production and economical sale, particularly for large, low-cost retailers who must provide a full-function feeder which is both attractive to the consumer and can be offered at a very competitive price.

Accordingly, is is an object of the present invention to provide an improved dog feeder for dogs for protecting and preserving food or fresh water to be made available upon self-initiated action of a dog.

It is a further object of the invention to provide such a full-function feeder which will provide adequate protection of the contents of the feeder against insects, ensuring that insects will be kept isolated from the feeder so that insects, such as ants, will not be permitted to gain access to the interior of the feeder and contents therein.

It is also an object of the invention to provide a feeder which will protect a relatively large quantity of food and/or water against heat, thereby reducing spoilage and preventing bacteria from growing in the contents, and thereby achieving greater unattended storage of food or water for longer periods of time than heretofore has been possible.

Yet another object of the invention is the provision of such a feeder which is of reliable, easily opened character, posing no difficulty for a dog to open with its nose, so as to gain access to its contents, while nevertheless continuing to at least partly protect the contents, even while the dog is taking food or water from the feeder, and further providing assured return of a closure to a fully closed position after the dog has ceased to consume the contents.

Another object of the invention is the provision of such a feeder which can be reliably tied down while in use, ensuring against the possibility of the feeder being tipped over or moved even by a relatively large, active, rowdy, clumsy or mischievous dog.

It is further an object of the invention to provide such a feeder which is of very simple, effective and simple construction, being amenable to mass-production, low-cost, wide-scale manufactur.

Other objects will be in part apparent and in part pointed out hereinbelow.

BRIEF DESCRIPTION OF THE DRAWINGS

FIG. 1 is a side elevational view of a dog feeder in accordance with and embodying the present invention.

FIG. 2 is a partial front elevation view thereof, showing how the new feeder can be tied down reliably.

FIG. 3 is a vertical cross section taken generally along line 3—3 of FIG. 2.

FIG. 4 is a top plan view thereof.

FIG. 5 is a fragmentary rear elevational view thereof, illustrating a hinge feature.

Corresponding reference characters indicate corresponding parts throughout the several views of the drawings.

DESCRIPTION OF THE PREFERRED EMBODIMENT

Referring now by reference characters to the drawings, a feeder of the invention is designated generally at 10. The new feeder generally comprises three main elements: a vessel 12 for containing food or fresh water for a dog to be made available to the dog upon self-initiated action; an insect isolating tray 14 which forms a moat 16 around the vessel 12 for receiving water or other liquid for providing a barrier to insects to prevent them from entering the vessel 12; and a hinged closure or lid 18 of dome-shaped configuration for normally keeping the vessel 12 tightly closed to keep out moisture and other contamination.

Extending forwardly from lid 18 is a handle-shaped bail 20 which is easily engaged by a dog by pressing its nose upwardly against the bail to lift the lid from its position shown, as in FIG. 3, upon a hinge pin 22, thereby gaining access to the interior of the vessel.

In general configuration, vessel 12 is of a cylindrical configuration. It may be constructed of steel, aluminum, or any of a variety of synthetic resin or polymeric materials such as ABS, polystyrene, polypropylene, polyethylene, and so forth, and thereby readily molded, as by injection molding, in the desired configuration integrally with tray 14.

Most preferably, vessel 12 is of double-wall configuration, including an outer wall 24, an inner wall 26 and a layer 28 of suitable thermal insulation such as formed polystyrene between them. Similarly, if desired, the floor 30 of vessel 12 may be double-walled, there being an outer surface 32 forming the bottom of tray 14, and with a layer 34 of such thermal insulation between the two surfaces 30, 32. Preferably, although not necessarily, a layer 36 of the thermal insulating material may be provided along the undersurface of lid 18 for enhancing the insulating capabilities of feeder 10.

Such insulation provides important advantages: Food may be placed within feeder 10 over relatively long periods and will stay cooler and thereby exhibit less spoilage than has been the case with previously known feeders. Also, if the feeder is used for holding fresh water, the water will stay at a temperature which is much more suitable for the animal.

The positional relationships between the vessel 12 and tray 14 is preferably concentric, its lower surface 32 extending outwardly from vessel 12 as an annular flange 38 which extends radially outwardly from the lower end of vessel 12 around its periphery, the flange having an up-standing lip 40 whereby said moat 16 is formed. Water or other liquids, such as insecticides or disinfectant, may be placed within moat 16 to a level 42. Crawling insects such as ants will not cross such a liquid barrier, and thereby will not gain access to the outer wall of vessel 12 which otherwise they could climb, particularly in the case of ants, and thereby gain access to the interior of the vessel. The annular moat 16 thereby serves to isolate vessel 12 from such insects.

According to the configuration preferred, a means is provided which interengages the lid 18 and vessel 12 for limiting the extent of lifting of lid 18 to a predetermined position, thereby assuring a continued protection of the contents of the vessel, even when the dog has obtained access to the vessel interior and also assuring subsequent closing of the lid under the force of gravity. For this purpose, hinge pin 22, which is horizontal, is located just above an outward projection 44 which is suitably secured to the outer wall of vessel 12. As the lid 18 tips upwardly, it will increasingly rock about pin 22, which is itself affixed to the vessel by a suitable attachment 46 and secured by hinge portions 47 to the lid, until the peripheral edge 48 or lid 18 contacts said projection 44, thereby preventing the lid from being raised above an inclined position 18' corresponding to an angle of inclination $\theta$. In this position, it will be noted that the lid still extends up over the top of the vessel and over the head of the animal which has gained access, there being just enough room for the animal to put its head into the space provided, and thereby continuing to partially protect the contents even in the case of rain. However, when the animal removes its head, force of gravity will cause lid 18 to return promptly to its fully closed, thermally insulating, protective position shown in FIG. 1.

On opposite sides of the vessel 12, there are provided radially outwardly extending tabs 50 which are of essentially handle-like configuration, each being provided with a respective aperture 52 such as will receive a rope, or spring, more preferably, such as illustrated at 54 in FIG. 2. Such springs 54 at opposite sides of the vessel may be secured to pegs or to anchor screws or augers, as at 56, for resiliently clamping the feeder tightly against the ground surface 58, and preventing it from being tipped over even by an active, rowdy, mischievous, clumsy or large dog.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A dump-proof, safely-used feeder for dogs for protecting and preserving food or fresh water to be made available to a dog upon self-initiated action of the dog, the feeder comprising an insulating vessel of generally cylindrical, upright configuration for receiving food or water, a closure secured to such vessel for normally covering and closing the vessel but being hinged to the vessel for being liftable against the force of gravity by the dog for permitting access by the dog to the vessel interior and contents therein, and an insect-isolating tray forming a moat around the vessel, for receiving in the moat water or other liquid for providing a barrier to insects to prevent them from entering the vessel, characterized by the moat being carried by the vessel at the lower end of the vessel and extending radially outwardly therefrom at the lower end of the vessel around its periphery in the form of a radial, horizontal flange having an upstanding lip to provide said moat with an annular configuration, and for increasing the stability of the feeder without use of extrinsic stabilizing structure, the vessel defining a peripheral upper edge, the closure being of dome-shaped configuration and providing a downwardly turned peripheral edge of rounded, blunt character for extending over and slightly below the peripheral upper edge of the vessel, the closure including a rounded, blunt extension extending laterally outwardly beyond such downwardly-turned peripheral closure edge for permitting the dog to raise the closure by action of its nose upwardly against such outward extension, and outwardly extending tabs, each including an aperture, at opposite sides of the feeder above the moat and integral to the feeder for stable securement of the feeder to a supportive surface, thereby to prevent the feeder from being dumped over or moved by the dog.

* * * * *